United States Patent [19]
Prasad et al.

[11] Patent Number: 5,941,940
[45] Date of Patent: Aug. 24, 1999

[54] DIGITAL SIGNAL PROCESSOR ARCHITECTURE OPTIMIZED FOR PERFORMING FAST FOURIER TRANSFORMS

[75] Inventors: Mohit K. Prasad, Bethlehem; Hosahalli R. Srinivas, Allentown, both of Pa.

[73] Assignee: Lucent Technologies Inc., Murray Hill, N.J.

[21] Appl. No.: 08/884,691

[22] Filed: Jun. 30, 1997

[51] Int. Cl.⁶ .............................. G06F 7/38; G06F 15/00
[52] U.S. Cl. ............................. 708/523; 708/404
[58] Field of Search .................. 364/725.01, 725.02, 364/725.03, 726.01, 726.02, 726.03, 726.04, 726.06, 726.07, 736.01, 736.04, 736.05, 748.17, 750.5, 754.01, 754.03

[56] References Cited

U.S. PATENT DOCUMENTS

| | | | |
|---|---|---|---|
| 3,777,131 | 12/1973 | Llewellyn | 364/726.02 |
| 4,354,249 | 10/1982 | King et al. | 364/754.03 |
| 4,612,626 | 9/1986 | Marchant | 364/726.02 |
| 5,038,311 | 8/1991 | Monastra et al. | 364/726.04 |

*Primary Examiner*—Chuong Dinh Ngo
*Attorney, Agent, or Firm*—Synnestvedt & Lechner LLP

[57] ABSTRACT

A digital signal processor architecture particularly adapted for performing fast Fourier Transform algorithms efficiently. The architecture comprises dual, parallel multiply and accumulate units in which the output of the multiplier circuit portion of each MAC is cross-coupled to an input of the adder unit of the other MAC as well as to an input of the adder unit of the same MAC to which the multiplier belongs.

21 Claims, 4 Drawing Sheets

DIGITAL SIGNAL PROCESSOR ARCHITECTURE OPTIMIZED FOR PERFORMING FAST FOURIER TRANSFORMS

FIELD OF THE INVENTION

The invention pertains to architectures for digital signal processors. More particularly, the invention pertains to processor architectures for performing fast Fourier Transforms.

BACKGROUND OF THE INVENTION

The Fourier Transform is a well-known mathematical operation for converting a signal from the time domain to the frequency domain. A Fourier Transform operates on a signal which is varying in time to derive the frequency components in the signal and their magnitudes. In the digital domain, the discrete Fourier Transform (DFT) is used to convert from the time domain to the frequency domain.

Fourier Transforms, and particularly discrete Fourier Transforms have many applications. One common application is in digital speech processing. For example, the wireless communications field, and particularly the cellular telephone communication field, has seen an exponential growth in data traffic over the past several years. However, the bandwidth availability for wireless communications is extremely limited. Accordingly, much effort has been dedicated to encoding speech data into a highly compressed form for transmission. For instance, a person can speak into a digital cellular telephone containing circuitry and/or software to digitize the speech, convert or compress it into a highly compressed digital format and transmit the compressed digital data. The receiving device contains circuitry and/or software for decoding the compressed digital data back into the original digital signal, converting it back to analog form and providing it to a listener. Digital encoding schemes for highly compressing video signals also are in wide use today. MPEG and JPEG being two of the more commonly known compression standards.

Some researchers are working on developing frequency domain compression algorithms for speech, video and other data. As such, an analog signal is first digitized and then converted into the frequency domain before it can be compressed. Accordingly, there is a need for a method and apparatus for performing Fourier Transforms as quickly as possible. Particularly, in order for frequency domain compression algorithms to be practical in the cellular telephone environment for speech signals, a Fourier Transform must be able to be performed essentially in real time.

One particularly fast way to perform discrete Fourier Transforms is known as the Fast Fourier Transform (FFT) method. Although there are many different algorithms for performing FFT, they all share a basic canonical unit operation that is repeated many times with different variables, but all sharing the same basic set of mathematical operations. The FFT algorithms can be performed in a programmable environment or by dedicated hardware. By programmable environment, we mean that the operation is performed primarily by software running on a general purpose machine, such as a FFT software algorithm running on a standard personal computer (PC). To date, purpose built dedicated hardware circuits for performing fast Fourier Transforms are under development that can approach the speeds needed for real-time applications. However, purpose built hardware is expensive and generally cannot be used for other purposes, but only for performing FFTs. Programmable environment solutions of fast Fourier Transform algorithms generally are less expensive than dedicated hardware, but usually are slower.

Accordingly, it is an object of the present invention to provide an improved hardware design for performing fast Fourier Transforms.

It is another object of the present invention to provide an improved digital processor apparatus for performing fast Fourier Transforms.

It is a further object of the present invention to provide an improved general purpose digital processor having an architecture that can perform fast Fourier Transforms very quickly.

It is yet another object of the present invention to provide an improved general purpose digital processor having an architecture that can perform fast Fourier Transforms very quickly in a programmable environment.

SUMMARY OF THE INVENTION

The invention is a general purpose digital processor architecture that is particularly adapted for performing fast Fourier Transforms extremely efficiently. Accordingly, using a processing device employing the architecture of the present invention, one can perform fast Fourier Transforms in a programmable environment extremely efficiently.

Particularly, the architecture of the present invention utilizes two parallel multiply and accumulate (MAC) units with a crossover coupling between the two MAC units.

The canonical unit of the FFT algorithm is the "butterfly" operation, in which the sum and difference of two complex products are generated. In the architecture of the present invention, the two parallel MACs simultaneously perform the two multiplication operations at the core of the butterfly operation. The multiply circuit of each MAC is followed by an adder circuit. The outputs of the two adders are forwarded to a common accumulator register file. The output of each multiply unit is coupled to one input terminal of the corresponding adder as well as to one input terminal of the adder of the other MAC unit. A third input terminal to each of the add circuits is coupled to the output of the common accumulator.

In this manner, one half of the entire canonical butterfly unit of the FFT calculation (i.e., the real or imaginary portion of the complex calculation) can be performed in a single instruction cycle.

DETAILED DESCRIPTION OF A PREFERRED EMBODIMENT OF THE INVENTION

Figure 1:
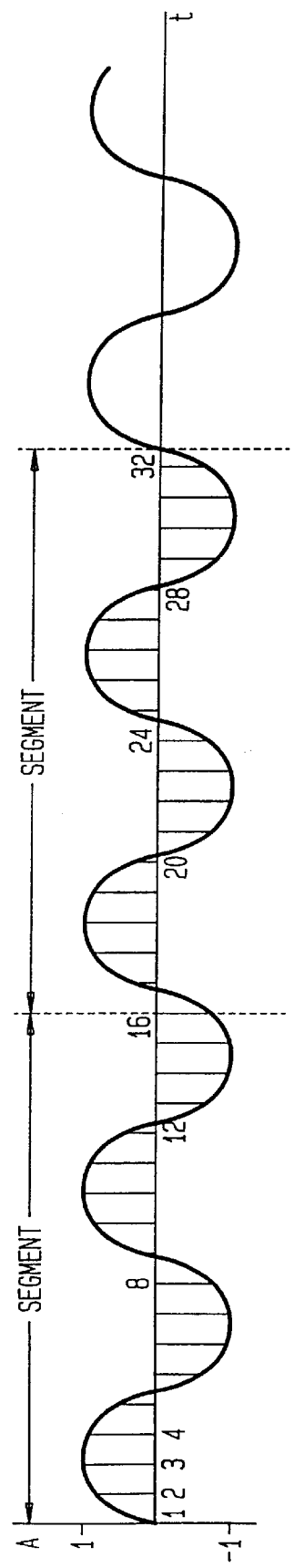
FIG. 1 is a graphical representation of a sinusoidal signal in the time domain.

FIG. 1 is a plot showing magnitude of an exemplary electromagnetic signal plotted against time. The signal is a sinusoidal signal of fixed frequency $\omega_0$. As noted above, the signal can be converted into the frequency domain by means of a Fourier Transform to determine the frequency components within the analog signal. This analog signal also can be digitized by sampling the signal at discrete instances in time with a fixed period between the samples. In order to avoid aliasing, the Nyquist condition must be met, i.e., the sampling rate must be at least twice the maximum frequency component of the signal.

In the digital domain, the digital samples of the signal can be put through a discrete Fourier Transform (DFT) mathematical algorithm to determine the frequency components of the signal in a discrete manner. In particular, in DFT analysis, the signal can be partitioned into contiguous segments of any desired duration, each segment comprising a plurality of samples. In the example shown in FIG. 1, the signal is sampled at a period that provides 16 sample points per segment. Utilizing the DFT algorithm, each segment of the signal can be converted into the frequency domain. The number of discrete frequency components which can be distinguished in the frequency domain is equal to the number of samples in the segment. Accordingly, the discrete Fourier Transform of each segment of the signal is distinguishable into sixteen different evenly spaced frequency components in the overall frequency band. The overall frequency band is dictated by the sampling frequency and the bandwidth of the signal and, particularly, spans from 0 hertz to one-half the sampling frequency as normalized with respect to the bandwidth of the signal.

Figure 2:
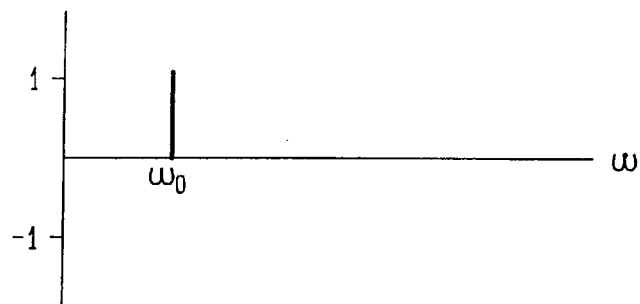
FIG. 2 is a graphical representation of the sinusoidal signal shown in FIG. 1 transformed into the frequency domain.

FIG. 2 is a graphical representation of the time domain signal of FIG. 1 transformed into the frequency domain by DFT analysis. FIG. 2 shows a plot of the magnitude of the signal versus frequency. Of course, since the time domain signal is a sine wave of fixed frequency, the frequency domain plot has only one frequency component, namely, a component at frequency $\omega_0$.

Figure 3:
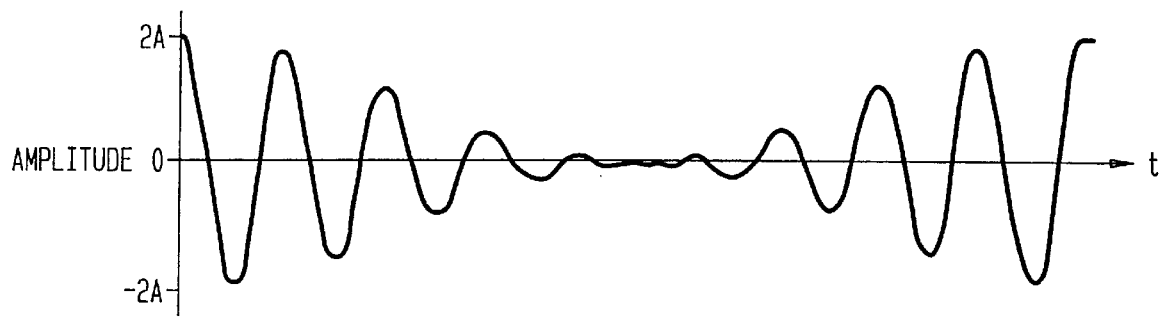
FIG. 3 is a graphical representation of an exemplary amplitude modulated signal in the time domain.

As another example, FIG. 3 illustrates a slightly more complex time domain signal. This is an amplitude modulated signal with an information content signal at frequency $\omega_m$ riding on a carrier frequency of $\omega_0$. When converted into the frequency domain, this signal has frequency components at $\omega_0-\omega_m$, $\omega_0$, and $\omega_0+\omega_m$.

The digital Fourier Transform is expressed as $$X(k) = \frac{1}{N}\sum_{n=0}^{N-1} x(n)e^{j\frac{2\pi kn}{N}}$$

where:

N is the number of samples in the designated time segment (and thus also the number of discrete frequency components in the frequency domain signal);

n is the particular index in the time domain sample, from n=0 to n=N-1;

x(n) is the magnitude of the time domain signal at time sample point corresponding to n;

k is the particular frequency domain component, from k=0 to k=N-1; and

X(k) is the magnitude of the frequency component at the frequency corresponding to k.

As can be seen from the equation above, the computational load for performing the DFT algorithm is proportional to 6 $N^2$. Particularly, each of x(n) and $e^{j2\pi kn/N}$ are complex numbers. Accordingly, each multiplication operation involves 4 multiplications and 2 adds, for a total of six operations. For each x(k), the 4 multiplications and 2 adds are performed N times. Further, x(k) must be calculated for k=1 to N. Accordingly, computational load is proportional to 6 $N^2$.

Fast Fourier Transform algorithms reduce the computational load from being proportional to 6 $N^2$ to $N\log_2 N$. While there are various algorithms for performing FFT, all of them share a basic canonical operation known as the FFT butterfly operation. FFT algorithms require that $N=2^R$, where R is a positive integer.

Figure 5:
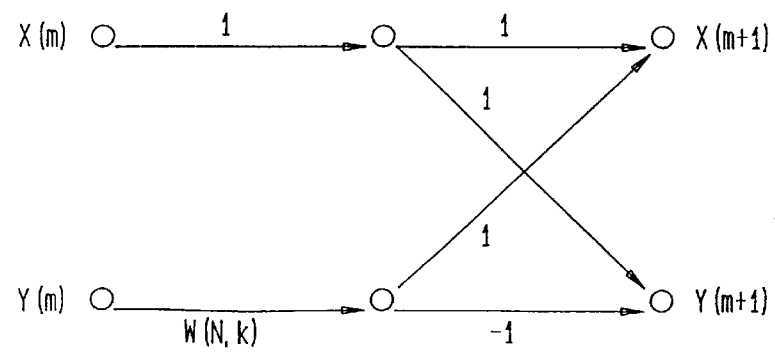
FIG. 5 is a graphical representation of the canonical butterfly unit of fast Fourier Transform algorithms.
Figure 6:
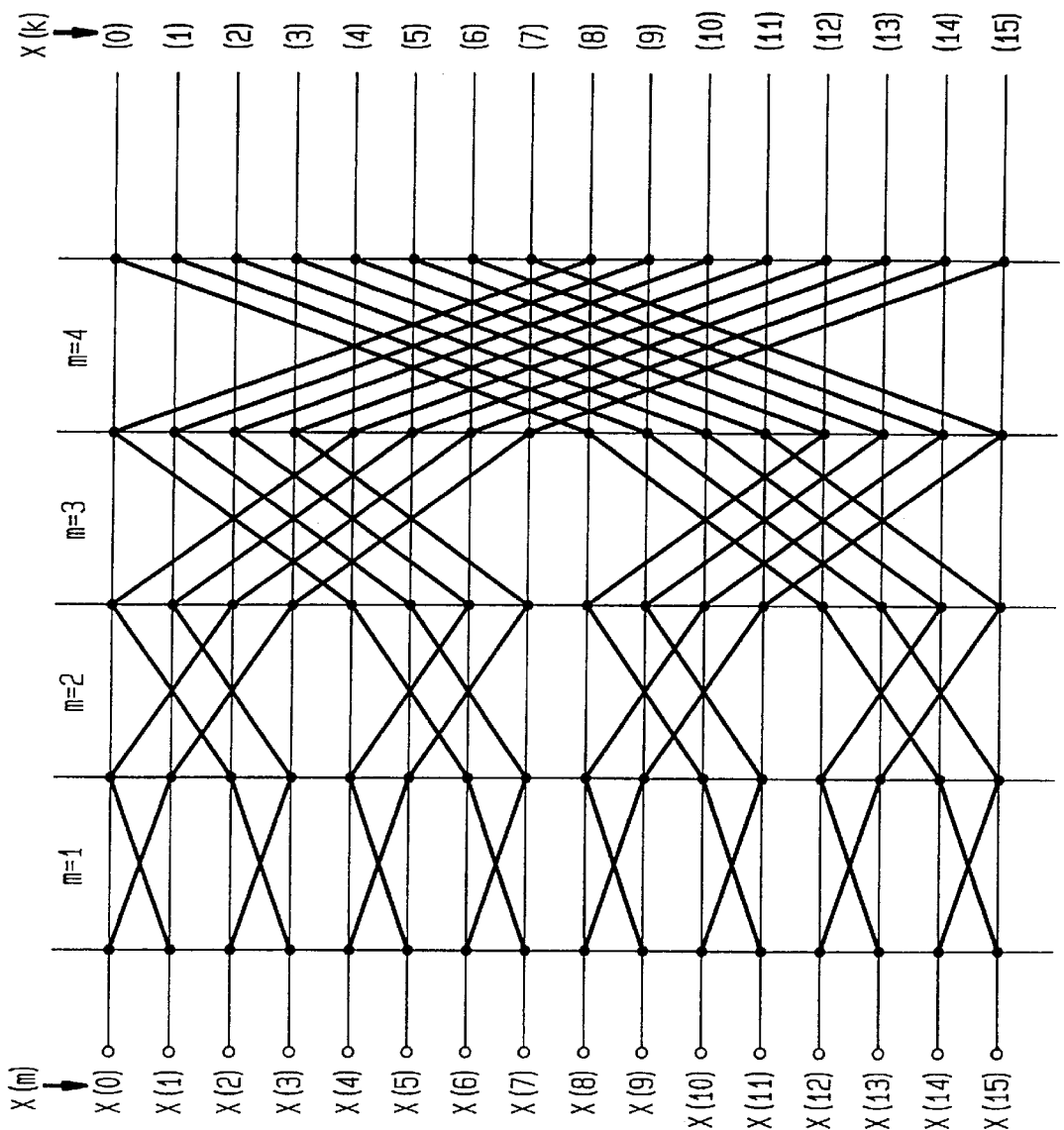
FIG. 6 is a graphical representation of an exemplary complete fast Fourier Transform algorithm.

FIG. 5 illustrates the canonical FFT butterfly operation, while equations 2 and 3 below illustrate the operation in mathematical notation.

$$X(m+1)=X(m)+W(N,k)Y(m) \quad \text{(Eq. 2)}$$

$$Y(m+1)=X(m)-W(N,k)Y(m) \quad \text{(Eq. 3)}$$

X and Y are input signals, as discussed in more detail below. W is a complex variable given by $W=e^{-j2\pi k/N}$. As can be seen from FIG. 3, the term butterfly comes from the fact that the canonical unit involves two equations, each involving an operation between the two input signals, X and Y, and a third variable, W(N,k). Specifically, a first result is obtained by adding the product of one of the input signals Y and the variable W(N,k) to the other input signal X, while the second result is obtained by subtracting the same product from the same input signal (i.e., the first input signal).

Since X(m), Y(m) and W(N,k) are each a complex number, let us assume that;

$$X(m)=b_1+jc_1 \quad \text{(Eq. 4)}$$

$$Y(m)=b_2+jc_2 \quad \text{(Eq. 5)}$$

$$W(N,k)=b_0+jc_0. \quad \text{(Eq. 6)}$$

Then, $$X(m+1)=b_1+b_0b_2-c_0c_2+j(c_1+b_0c_2+c_0b_2) \quad \text{(Eq. 7)}$$

$$Y(m+1)=b_1-b_0b_2+c_0c_2+j(c_1-b_0c_2-c_0b_2) \quad \text{(Eq. 8)}$$

As can be seen, calculating the real parts of X(m+1) and Y(m+1) calls for 4 multiplications and 4 additions each. However, the four multiplications in the equation for X(m+1) are the same multiplications as in the equation for Y(m+1), namely, $b_0b_2$, $c_0c_2$, $b_0c_2$, and $c_0b_2$).

Figure 4:
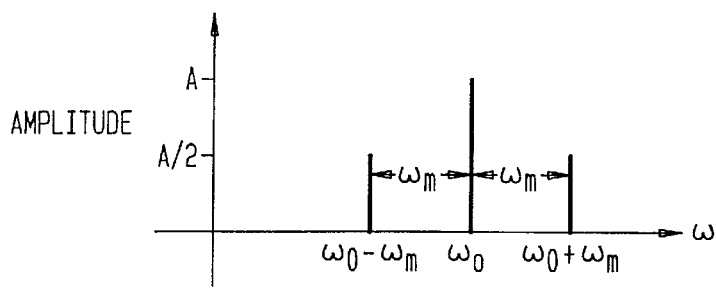
FIG. 4 is a graphical representation of the amplitude modulated signal of FIG. 3 transformed into the frequency domain.

In all FFT algorithms, the canonical FFT butterfly operation is executed many times with different variables, X, Y and W, to arrive at the fast Fourier transform of a time domain signal segment. FIG. 4 helps illustrate a small scale complete FFT mathematical operation. As shown, the inputs on the left-hand side of FIG. 4 are the time domain samples X(0) through X(15) from FIG. 1, and correspond to input variables X and Y of equations 2 and 3 above, as explained more fully below. With sixteen samples, the FFT operation goes through 4 stages, m=1 through m=4. As can be seen from equations 2 and 3, the butterfly operation is performed on pairs of inputs. Since there are 16 samples, in each stage m=1 through m=4, the butterfly operation is performed 8 times. In stage m=1, for instance, the 8 pairs of inputs are (1) X(0) and X(1), (2) X(2) and X(3), (3) X(4) and X(5), (4) X(6) and X(7), (5) X(8) and X(9), (6) X(10) and X(11), (7) X(12) and X(13), and (8) X(14) and X(15). Thus for example, referring to FIG. 5, in the very first butterfly operation, the time domain sample X(0) corresponds to X(m) in equations 2 and 3, while the time domain input X(1) in FIG. 5 corresponds to Y(m) in equations 2 and 3. In the m=1 stage, the inputs, e.g., X(0) and X(1) are the actual time domain samples and, therefore, are non-complex (i.e., contain only a real part). The variable W(N,k), however, is complex. Accordingly, despite the fact that the original inputs in stage m=1 are real only, the operation is, nevertheless, complex. Further, for all subsequent stages, m=2 to m=4, typically all numbers will be complex.

In the second stage, m=2, the output of the first stage, corresponding to the X(0) row, is mixed with the output of the third row, corresponding to X(2), in the butterfly operation. Likewise, the X(1) row is mixed with the X(3) row, the X(4) row is mixed with the X(6) row, the X(5) row is mixed with the X(7) row, the X(8) row is mixed with the X(10) row, the X(9) row is mixed with the X(11) row, the X(12) row is mixed with the X(14) row and the X(13) row is mixed with the X(15) row.

In the third stage, the X(0) row is mixed with the X(3) row, the X(1) row is mixed with the X(5) row, the X(2) row is mixed with the X(6) row, the X(3) row is mixed with the X(7) row, the X(8) row is mixed with the X(12) row, the X(9) row is mixed with the X(13) row, the X(10) row is mixed with the X(14) row and the X(11) row is mixed with the X(15) row.

Finally, in the last stage, m=4, the X(0) row is mixed with the X(8) row, the X(1) row is mixed with the X(9) row, the X(2) row is mixed with the X(10) row, the X(3) row is mixed with the X(11) row, the X(4) row is mixed with the X(12) row, the X(5) row is mixed with the X(13) row, the X(6) row is mixed with the X(14) row, and the X(7) row is mixed with the X(15) row.

Thus, in the illustrated example, in which 16 samples are taken per segment of the time domain signal, the butterfly operation is performed 8 times in each stage, and there are 4 stages. Accordingly, the butterfly operation is performed 8×4=32 times.

In most real life situations, the number of samples will be substantially greater than 16. For example, segments comprising 256, 512, and 1024 samples are commonly used.

Figure 7:
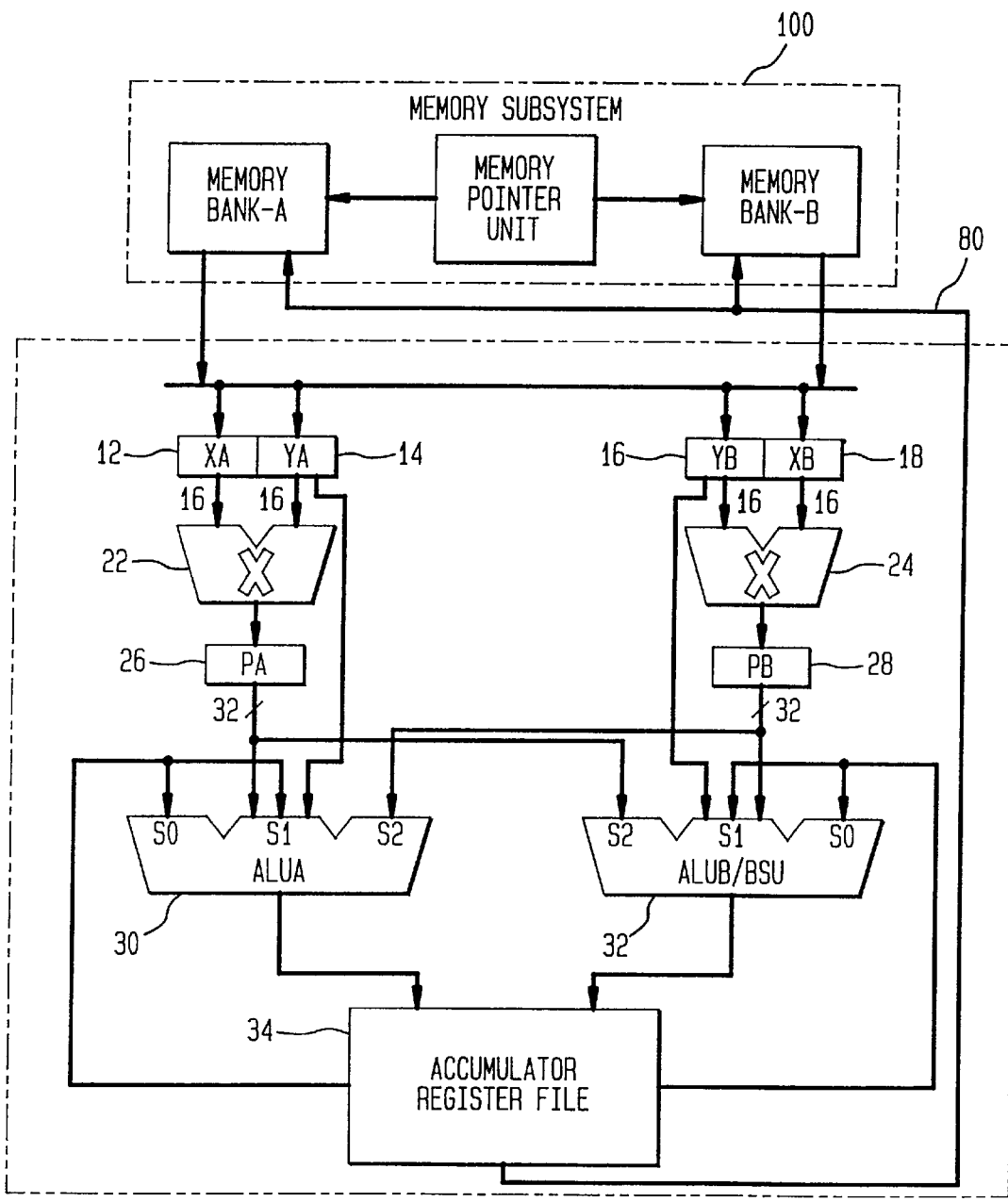
FIG. 7 is a block diagram of a digital signal processor architecture in accordance with the present invention.

FIG. 7 is a block diagram of a processor architecture in accordance with the present invention employing dual parallel multiply and accumulate units (MACs) with a crossover connection between the two MACs which allows the FFT butterfly operation to be performed in only two instruction cycles.

The architecture comprises two parallel and cross connected MACs A and B. The two parallel MACs are essentially identical in structure. MAC A comprises data registers 12 and 14 for receiving data from a memory 100 through memory bus 80. MAC B comprises two identical registers 16 and 18. The inputs to all of the registers 12, 14, 16, 18 are coupled to the memory bus 80. The output of register 12 is coupled to the first input of multiplier unit 22, while the output of register 14 is coupled to the second input of multiplier unit 22. A similar arrangement exists in the second MAC unit, with the outputs of registers 16 and 18 coupled to first and second inputs, respectively, of the multiplier unit 24. The outputs of the two multiplier units 22 and 24 are coupled to product accumulators 26 and 28, respectively. The product accumulators are followed by arithmetic logic units (ALUs) 30 and 32, respectively. The outputs of the two ALUs are both coupled to a common accumulator register file 34.

ALU 30 will be described herein in detail, it being understood that, in the preferred embodiment of the invention, ALU 32 is identical to ALU 30, except as otherwise noted. ALU 30 has three input terminals, S0, S1 and S2. It also has a multiplexer for selecting one of three input source paths to input S1. Input terminal S0 is coupled to the output of the accumulator register file 34 in order to provide wrap-around arithmetic operations from instruction cycle to instruction cycle. Terminal S1 of ALU 30 is coupled to the output of the corresponding product accumulator 26 of MAC A. Terminal S2 of ALU 30 is coupled to the product accumulator 28 of the parallel MAC B.

Terminal S1 also is coupled to receive signals from the output of accumulator register file 34 as well as the accumulator register 14. However, with respect to the present invention, the only relevant input source to terminal S1 of ALU 30 is the output of product accumulator 26. The other connections are provided in order to make the processor architecture a general purpose architecture so as to be useable for a wide variety of other mathematical, logical and other operations.

MAC B is structurally identical to MAC A. Input terminal S2 of ALU 32 is coupled to the output of the product accumulator 26 of MAC A and input terminal S1 of ALU 32 is coupled to receive the output of the product accumulator 28 of MAC B.

In this dual MAC with crossover connection architecture, the canonical FFT butterfly operation can be performed in only two cycles. Particularly, referring to equations 7 and 8, which are reproduced below again for ease of reference, the entire result for the real part of equations 7 and 8 can be calculated in one cycle since, as mentioned above, the two multiplications required in the real portion of equation 7 are the same as the two multiplications in the real portion of equation 8.

$$X(m+1)=b_1+b_0b_2-c_0c_2+j(c_1+b_0c_2+c_0b_2) \quad \text{(Eq. 7)}$$

$$Y(m+1)=b_1-b_0b_2+c_0c_2+j(c_1-b_0c_2-c_0b_2) \quad \text{(Eq. 8)}$$

Accordingly, if the products $b_0b_2$ and $c_0c_2$ can be calculated simultaneously and then simultaneously added and subtracted from $b_1$, half of the butterfly operation can be performed in one instruction cycle. The architecture illustrated in FIG. 7 provides for such a possibility.

Particularly, accumulator 14 can be supplied with value $b_0$ from memory 100 while accumulator 16 is supplied with value $b_2$ from memory 100. At the same time, accumulator 18 is supplied with value $c_2$ and accumulator 20 is supplied with the value $c_0$. Multiplier 22 calculates and outputs the product $b_0b_2$ while multiplier 24 simultaneously calculates and outputs the product $c_0c_2$. The output $b_0b_2$ is passed through product accumulator 26 to input terminal S1 of ALU 30 as well as to input terminal S2 input of ALU 32. Likewise, the product $c_0c_2$ is passed through product accumulator 28 through the S1 input of ALU 32 as well as to the S2 input of ALU 30. The value of $b_1$ is supplied from the accumulator register file 34 to the S0 input of both ALU 30 and ALU 32. ALU 30 is capable of adding all three values at its three inputs. It will be understood by those skilled in the art that the terms "add" and "sum" and variations thereof as used herein and in the processor field in general encompasses both addition and subtraction. Accordingly, ALU 30 can calculate $b_1+b_0b_2-c_0c_2$, while ALU 32 is simultaneously computing $b_1-b_0b_2+c_0c_2$. Accordingly, the entire real parts of the solutions for X(m+1) and Y(m+1) in equations 7 and 8 are calculated simultaneously in the MAC in a single cycle. In the next cycle, the same operation can be performed with respect to the imaginary parts of X(m+1) and Y(m+1). Accordingly, with this architecture, the entire FFT butterfly operation can be performed in two instruction cycles.

However, the architecture is a general processor architecture that can perform as wide a variety of mathematical and logical operations as any other general purpose processor architecture.

When the full FFT algorithm, including data loading cycles, is considered, the FFT butterfly operation can be performed in 4 cycles. With dual parallel MACs without crossover, the butterfly operation would require at least six cycles; a net penalty of 50%.

A statistical analysis has been performed in order to calculate the overall savings in instruction cycles achieved by the present invention for a practical complete FFT algorithm. The architecture of the present invention performs an overall FFT operation in as little as 37% of the time that would be necessary for an architecture including two parallel processors operating simultaneously, but without crossover.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A processor comprising:
   first and second multipliers, each having first and second inputs for receiving digital signals and an output that is the product of signals applied at said first and second inputs;
   first and second adders, each having first, second and third inputs for receiving digital signals and an output, each of said first and second adders capable of generating at its output a sum of said digital signals at its inputs;
   said output of said first multiplier coupled to said first input of said first adder and to said second input of said second adder; and
   said output of said second multiplier coupled to said first input of said second adder and said second input of said first adder.

2. A processor as set forth in claim 1 further comprising:
   an accumulator having first and second inputs coupled to said outputs of said first and second adders, respectively, and an output coupled to said third inputs of said first and second adders, respectively.

3. A processor as set forth in claim 2 further comprising:
   a memory coupled to said first and second inputs of said first and second multipliers, respectively, for supplying to said multipliers said digital signals from which said first and second products are to be calculated.

4. A processor as set forth in claim 3 wherein:
   said output of said accumulator is further coupled to said memory.

5. A processor as set forth in claim 4 wherein said first and second adders each comprise an arithmetic logic unit.

6. A processor as set forth in claim 5 further comprising:
   a first register coupled between said memory and said first input of said first multiplier;
   a second register coupled between said memory and said second input of said first multiplier;
   a third register coupled between said memory and said first input of said second multiplier; and
   a fourth register coupled between said memory and said second input of said second multiplier.

7. A processor as set forth in claim 6 further comprising:
   a fifth register having an input coupled to said output of said first multiplier and an output coupled to said first input of said first adder and said second input of said second adder; and
   a sixth register having an input coupled to said output of said second multiplier and an output coupled to said second input of said first adder and said first input of said second adder.

8. A method for performing in a digital processing apparatus a calculation of;

$X = b_1 + b_0 b_2 - c_0 c_2$, $Y = b_1 - b_0 b_2 + c_0 c_2$, said method comprising the steps of:
   (1) simultaneously multiplying in first and second parallel multipliers $b_0 b_2$ and $c_0 c_2$, respectively;
   (2) simultaneously calculating in first and second parallel adders $b_1 + b_0 b_2 - c_0 c_2$ and $b_1 - b_0 b_2 + c_0 c_2$, respectively.

9. A method as set forth in claim 8 wherein step (2) comprises;
   (2.1) providing $b_0 b_2$ from said first multiplier to a first input terminal of said first adder and to a second input terminal of said second adder;
   (2.2) providing $c_0 c_2$ from said second multiplier to a second input terminal of said first adder and to a first input terminal of said second adder;
   (2.3) providing $b_1$ to a third input terminal of each of said first and second adders; and
   (2.4) each of said adders separately adding said values applied to their input terminals in accordance with said equations $b_1 + b_0 b_2 - c_0 c_2$ and $b_1 - b_0 b_2 + c_0 c_2$, respectively.

10. A method as set forth in claim 9 wherein step (1) comprises:
   (1.1) providing $b_0$ from a memory to a first input terminal of said first multiplier;
   (1.2) providing $b_2$ from said memory to a second input terminal of said first multiplier;
   (1.3) providing $c_0$ from said memory to a first input terminal of said second multiplier;
   (1.4) providing $c_2$ from said memory to a second input terminal of said second multiplier;
   (1.5) each of said first and second multipliers separately multiplying said values applied to their input terminals, respectively.

11. A method for performing in a digital processing apparatus a calculation of;

$X(m+1) = b_1 + b_0 b_2 - c_0 c_2 + j(c_1 + b_0 c_2 + c_0 b_2)$, $Y(m+1) = b_1 - b_0 b_2 + c_0 c_2 + j(c_1 - b_0 c_2 - c_0 b_2)$, said method comprising the steps of:
   (1) simultaneously multiplying in first and second parallel multipliers $b_0 b_2$ and $c_0 c_2$, respectively;
   (2) simultaneously calculating in first and second parallel adders $b_1 + b_0 b_2 + c_0 c_2$ and $b_1 - b_0 b_2 + c_0 c_2$, respectively;
   (3) simultaneously multiplying in said first and second parallel multipliers $b_0 c_2$ and $c_0 b_2$, respectively; and
   (4) simultaneously calculating in first and second parallel adders $c_1 + b_0 c_2 + c_0 b_2$ and $c_1 - b_0 b_2 - c_0 b_2$, respectively.

12. A method as set forth in claim 11 wherein step (2) comprises;
   (2.1) providing $b_0 b_2$ from said first multiplier to a first input terminal of said first adder and to a second input terminal of said second adder;

(2.2) providing $c_0c_2$ from said second multiplier to a second input terminal of said first adder and to a first input terminal of said second adder;

(2.3) providing $b_1$ to a third input terminal of each of said first and second adders; and (2.4) each of said adders separately adding said values applied to their input terminals in accordance with said equations $b_1+b_0b_2-c_0c_2$ and $b_1-b_0b_2+c_0c_2$, respectively.

13. A method as set forth in claim 12 wherein step (1) comprises:

(1.1) providing $b_0$ from a memory to a first input terminal of said first multiplier;

(1.2) providing $b_2$ from said memory to a second input terminal of said first multiplier;

(1.3) providing $c_0$ from said memory to a first input terminal of said second multiplier;

(1.4) providing $c_2$ from said memory to a second input terminal of said second multiplier;

(1.5) each of said first and second multipliers separately multiplying said values applied to their input terminals, respectively.

14. A method as set forth in claim 13 wherein step (4) comprises;

(4.1) providing $b_0c_2$ from said first multiplier to a first input terminal of said first adder and to a second input terminal of said second adder;

(4.2) providing $c_0b_2$ from said second multiplier to a second input terminal of said first adder and to a first input terminal of said second adder;

(4.3) providing $c_1$ to a third input terminal of each of said first and second adders; and (4.4) each of said first and second adders separately adding said values applied to their input terminals in accordance with said equations, $c_1+b_0c_2+c_0b_2$ and $c_1-b_0b_2-c_0b_2$, respectively.

15. A method as set forth in claim 14 wherein step (3) comprises:

(3.1) providing $b_0$ from a memory to a first input terminal of said first multiplier;

(3.2) providing $c_2$ from said memory to a second input terminal of said first multiplier;

(3.3) providing $c_0$ from said memory to a first input terminal of said second multiplier;

(3.4) providing $b_2$ from said memory to a second input terminal of said second multiplier;

(3.5) each of said first and second multipliers separately multiplying said values applied to their input terminals, respectively.

16. A method for performing in a digital processing apparatus a butterfly operation of a fast Fourier Transform, said method comprising the steps of:

(1) simultaneously calculating in first and second parallel multipliers, first and second products;

(2) providing to a first input terminal of a first adder and to a second input terminal of a second adder said first product;

(3) simultaneously with step (2), providing to a second input terminal of said first adder and to a first input terminal of said second adder said second product;

(4) simultaneously with steps (2) and (3), providing to a third input terminal of each of said first and second adders a value;

(5) in said first adder, adding said value to said first product and subtracting said second product therefrom;

(6) simultaneously with step (5), in said second adder, subtracting said first product from said value and adding said second product thereto; and (7) repeating steps (1) through (6) for third and fourth products and a second value.

17. A processor for performing fast Fourier Transforms comprising:

first and second multipliers, each having first and second inputs for receiving digital signals and an output that is the product of signals applied at said first and second inputs;

first and second adders, each having first, second and third inputs for receiving digital signals and an output that is the sum of said first, second and third signals at said inputs of said adders;

said output of said first multiplier coupled to said first input of said first adder and to said second input of said second adder; and said output of said second multiplier coupled to said first input of said second adder and said first input of said first adder.

18. A computer having a central processing unit, said central processing unit comprising:

first and second multipliers, each having first and second inputs for receiving digital signals and an output that is the product of signals applied at said first and second inputs;

first and second arithmetic logic units, each having first, second and third inputs for receiving digital signals and an output, each of said arithmetic logic units adapted to place on said output the sum of said first, second and third signals at said inputs of said arithmetic logic units;

said output of said first multiplier coupled to said first input of said first arithmetic logic unit and to said second input of said second arithmetic logic unit; and said output of said second multiplier coupled to said first input of said second arithmetic logic unit and said first input of said first arithmetic logic unit.

19. A computer as set forth in claim 18 further comprising:

an accumulator having first and second inputs coupled to said outputs of said first and second arithmetic logic units, respectively, and an output coupled to said third inputs of said first and second arithmetic logic units, respectively.

20. A computer as set forth in claim 19 wherein:

said output of said accumulator is further coupled to said memory.

21. A computer as set forth in claim 20 further comprising:

a memory coupled to said first and second inputs of said first and second multipliers, respectively.

* * * * *